United States Patent [19]
Ramfelt et al.

[11] Patent Number: 5,960,002
[45] Date of Patent: Sep. 28, 1999

[54] DEFRAGMENTATION METHOD AND ARRANGEMENT

[75] Inventors: Lars Ramfelt, Kista; Christer Bohm; Per Lindgren, both of Stockholm, all of Sweden

[73] Assignee: Dynarc AB, Sweden

[21] Appl. No.: 08/770,359

[22] Filed: Dec. 20, 1996

[30] Foreign Application Priority Data

Dec. 28, 1995 [SE] Sweden .................................. 9504680

[51] Int. Cl.$^6$ ............................................... H04L 12/417
[52] U.S. Cl. ............................................ 370/450; 370/458
[58] Field of Search .................................... 370/229, 230, 370/235, 257–258, 400–401, 445, 447, 449–452, 453–454, 457–462, 468, 474, 477, 489; 340/825.05; 395/287, 289, 293, 298, 297, 308

[56] References Cited

U.S. PATENT DOCUMENTS

| | | | |
|---|---|---|---|
| 4,553,234 | 11/1985 | Brandsma et al. | 370/458 |
| 4,713,807 | 12/1987 | Caves et al. | 370/460 |
| 4,949,336 | 8/1990 | Hamada et al. | 370/460 |
| 5,166,678 | 11/1992 | Warrior | 370/462 |
| 5,517,499 | 5/1996 | Gauffin et al. | 370/503 |
| 5,592,484 | 1/1997 | Albano et al. | 370/452 |
| 5,734,656 | 3/1998 | Prince et al. | 370/401 |

FOREIGN PATENT DOCUMENTS 0 451 426 B1  11/1994  European Pat. Off. .

OTHER PUBLICATIONS

Article: *The DTM Gigabit Network* by Christer Bohm, Per Lindgren, Lars Ramfelt, Peter Sjodin; dated Jun. 17, 1993; pp. 1–20, 22–23.

Article: Fast Circuit Switching for the Next Generation of High Performance Networks; *IEEE Journal on Selected Areas in Communications*, vol. 14, No. 2, Feb. 1996, by Christer Bohm, Markus Hidell, Per Lindgren, Lars Ramfelt, and Peter Sjödin; pp. 298–305.

Article: Multi–gigabit networking based on DTM—A TDM medium access technique with dynamic bandwidth–allocation; *Computer Networks and ISDN Systems* 24 (1992) 119–130 North–Holland; by Lars Gauffin, Lars Håkansson, and Björn Pehrson; pp. 119–130.

Article: Incorporating continuation–of–message information, slot reuse, and fairness in DPDB networks; *Computer Networks and ISDN Systems* 24 (1992) 153–169 North Holland; by Subrata Banerjee and Biswanath Mukherjee; pp. 153–169.

Article: MetaRing—A Full Duplex Ring with Fairness and Spatial Reuse; *IEEE Transactions on Communications*, vol. 41, No. 1, Jan. 1993; by Israel Cidon and Yoram Ofek; pp. 110–120.

Article: *A Simple Scheme for Slot Reuse Without Latency for a Dual Bus Configuration*; by Oran Sharon and Adrian Segall, 1993 IEEE, 9 pages.

Article: *A Study of Slot Reuse in Dual Bus Multiple Access Networks* by Mark W. Garrett and San–Qei Li; 1990 IEEE, pp. 617–629.

Article: *L. Ramfelt;* by Manoel A. Rodrigues, AT&T Bell Laboratories, Holmdel, NJ 07733; 1990 IEEE; pp. 636–643.

*Primary Examiner*—Chi H. Pham
*Assistant Examiner*—Ricky Q. Ngo
*Attorney, Agent, or Firm*—Fasth Law Offices; Rolf Fasth

[57] ABSTRACT

The present invention relates to a defragmentation method and arrangement for increasement of the average block size of free tokens in the nodes of a DTM (Dynamic Synchronous Transfer Mode) network. The defragmentation comprises defining a home node for each token at network startup in such way that the tokens sharing the same home node will always define at least partly a continuous slot range, sending back free tokens to home nodes when a significant time has passed and, merging two or more slot-consecutive tokens with the same slot range into a single token when existing in the free pool of a node. The defragmentation can be realized in a central or a distributed token management scheme.

22 Claims, 12 Drawing Sheets

5,960,002

DEFRAGMENTATION METHOD AND ARRANGEMENT

TECHNICAL FIELD OF THE INVENTION

The present invention relates to a defragmentation method and arrangement for increasement of the average block size of free tokens in the nodes of a DTM (Dynamic Synchronous Transfer Mode) network.

DESCRIPTION OF RELATED ART

New high-capacity communication networks and protocols are constantly being developed by the communications industry and academia. This development change frequently and new results are important to application developers who integrate real-time audio, video, and asynchronous communication services into applications. The applications can be found on a wide range of network access terminals. Terminals act as network hosts and may be almost any electronic device, including small pocket telephones or television sets, multi-media workstations, and million-dollar supercomputers. Hosts differ by orders of magnitude in their needs for processing power, and in their communication services requirements. These disparate needs are currently reflected in a set of independent network classes. Each network class is optimized for its particular traffic and applications: Cable Television networks use unidirectional broadcast networks where the capacity is divided into fixed-sized subchannels carrying video. A telephone network uses only 64 kbit/s duplex circuits with guaranteed throughput and tightly controlled delay variations. Computer networks, such as the Internet, allow a large number of parallel network sessions by use of connectionless packet switching. They also use statistical multiplexing to efficiently utilize links. A backbone network for mobile systems needs extra control (or signaling) capacity to dynamically track all active terminals.

With this wide spectrum of applications existing today and to be augmented in the future, it is infeasible to continually invent new, sometimes global, networks and a new terminal interface for each new type of service. Instead, an integrated services network supporting existing and new services needs to be deployed. The overall goals for such a network are scalability to global size and maximum sharing of expensive network components to minimize cost. Optical transmission technology has been shown to provide the necessary link capacity at a low enough price to make integrated services networks a realistic solution.

A new integrated optical network with much higher capacity will, however, introduce new problems not seen in today's more specialized and lower performance networks. First, when network capacity increases and the information flight latency remains limited by the speed of light, the increasing bandwidth delay product will put higher demand on mechanisms that isolate a user's traffic from third-party network traffic. A telephone session, for example, should not be affected by another user opening a high-capacity video channel. Second, applications and protocols will need to operate reliably with an increasing amount of information in transit to benefit from the increased network capacity. This will lead to larger burst and transaction sizes in the network.

Current networks using stateless packet switching protocols such as the IP (Internet Protocol) have turned out to be extremely scalable. They have evolved from small networks connecting just a few DARPA (Defense Advanced Research Projects Agency) research computers in the mid seventies to the current global and ubiquitous Internet. Shared medium LAN's (Local Area Networks) such as CSMA/CD (Carrier Sense Multiple Access/Collision Detection, token ring and FDDI (Fiber Distributed Data Interface) are used in the Internet as simple building blocks connected by routers or bridges. The combination of easy expansion, low incremental node cost and tolerance to faulty nodes has resulted in simple, flexible, and robust networks. Also, the shared medium allows efficient application of new multicast protocols such as IP multicast.

A drawback of the shared medium is that it typically permits only a single terminal to transmit at any time not utilizing all network segments efficiently. A scheme allowing the capacity of the medium to be reused may be designed, but this is often at the cost of complexity in the high-speed access control hardware. Access control mechanisms for a shared medium also depend strongly on the size of the network and are usually efficient only for local area environments.

The two main types of network are connection oriented circuit-switched networks used for telephony, and connectionless packet-switched networks exemplified by the Internet. When a circuit-switched network is used for data communication, circuits need to remain open between bursts of information, wasting network capacity. This problem arises because circuit management operations are slow compared to dynamic variations in user demand. Another source of overhead in circuit-switched networks is the limitation of requiring symmetrical duplex channels, which introduce 100% overhead when information flow is unidirectional. This constraint also makes multicast circuits difficult to implement and inefficient. A connectionless packet-switched network, on the other hand, lacks resource reservation and must add header information to each message before transmission. Furthermore, latency in a connectionless packet-switched network cannot be accurately predicted and packets may even be lost due to buffer overflow or corrupted headers. The latter two factors make real-time service difficult to support. Congestion avoidance mechanisms can isolate traffic streams of different users. These schemes are, however, limited to operating on a time scale comparable to the round-trip packet delay.

To address the problems mentioned above, the communications industry is focusing on the development of ATM (Asynchronous Transfer Mode). ATM has been proposed for LAN's and many future public networks. CCITT (International Telegraph and Telephone Consultative Committee) also adopted it to be used as the transfer standard in B-ISDN (Broadband-Integrated Services Digital Network). ATM networks are connection-oriented and establish a channel just as circuit-switched networks, but use small fixed-sized packets called cells for information transfer. The packet-switched nature of ATM means that the network needs to have new mechanisms such as buffer resource managers and link schedulers to establish real-time guarantees for a connection i.e. virtual channel/path.

Another solution for providing real-time guarantees centers on a circuit switched network and must therefore address circuit-switching concerns such as described above. A new shared-medium control protocol is also employed, and so have common shared-medium problems to be considered. This design, called DTM (Dynamic Synchronous Transfer Mode), (see e.g. Christer Bohm, Perl Lindgren, Lars Ramfelt, and Peter Sjödin, The DTM Gigabit Network, *Journal of High Speed Networks,* 3(2):109–126, 1994 and Lars Gauffin, Lars Håkansson, and Björn Pehrson, Multigigabit networking based on DTM, Computer Networks and ISDN Systems, 24(2):119–139, April 1992) uses channels as the communication abstraction. This channels differ from telephony circuits in various ways. First, establishment delay is short so that resources can be allocated/deallocated dynamically as fast as user requirements change. Second, they are simplex and so minimize overhead when the communication is unidirectional. Third, they offer multiple bit-rates to support large variations in user capacity requirements. Finally, they are multicast, allowing any number of destinations.

DTM channels share many beneficial properties with circuits. There is no transfer of control information after channel establishment, resulting in very high utilization of network resources for large data transfers. Support of real-time traffic is natural; there is no need for policing, congestion control or flow-control within the network. The control information is separated from data, which makes multicast less complex. The transmission delay is negligible (i.e. less than 125 µs) and there is no potential for data loss because of buffer overflow as in ATM. Bit-error rates depend on the underlying link technologies, and switches are simple and fast due to strict reservation of resources at channel setup.

DTM can show good performance in areas where traditional circuit-switched networks fall short: dynamic bandwidth allocation, channel establishment delay, and as shared media networks.

SUMMARY OF THE INVENTION

One of the major problems using DTM with block tokens, especially with a distributed token manager, is fragmentation.

The average number of contiguous free time slots in a node of a DTM network is small, due to the random movement of tokens and the varying capacity of users request. This gives relatively long access delays (in the millisecond region) for high capacity channels, particularly at moderate to high load.

The object of the invention is to solve this fragmentation problem. This is accomplished with a defragmentation method and arrangement for increasement of the average block size of free tokens in the nodes of the DTM network.

The defragmentation according to the invention comprises defining a home node for each token at network startup or during network operation in such way that the tokens sharing the same home node will always define at least partly a continuous slot range, sending back free tokens to home nodes when a significant time has passed and, merging two or more slot-consecutive tokens into a single token when existing in the free pool of a node.

The defragmentation method according to the invention avoids the problem mentioned above. The method returns tokens to their home nodes as a way to increase the probability that two consecutive tokens can be merged in the free pool of the nodes which decreases fragmentation.

An advantage with the invention is that it can be realized in both a central or a distributed token management scheme or in a combination of these schemes. The best improvement in terms of access delay is obtained in the distributed token management scheme.

Another advantage is that the new home nodes can be defined for tokens during network operation.

Yet another advantage is that the significant time can be chosen in several ways: as an idle time, as a last home time or after a significant number of signal transfers or as a combination of these ways. The significant time has to be chosen to optimize the performance; if the time is to short the defragmentation method and arrangement will yield less sharing of resources and if it is too long fragmentation will still be a problem.

Yet another advantage is an improved performance when combined with a slot reuse method allowing data slots to be used for simultaneous transmissions over disjointed segments of the network. The defragmentation method and arrangement will then be used in both slot and segment dimensions. The defragmentation method and arrangement according to the invention may preferably prioritize merging segments before merging slots.

BRIEF DESCRIPTION OF THE DRAWINGS

The invention will be described in greater detail below with reference to enclosed drawing, in which.

DETAILED DESCRIPTION OF EMBODIMENTS

Figure 1:
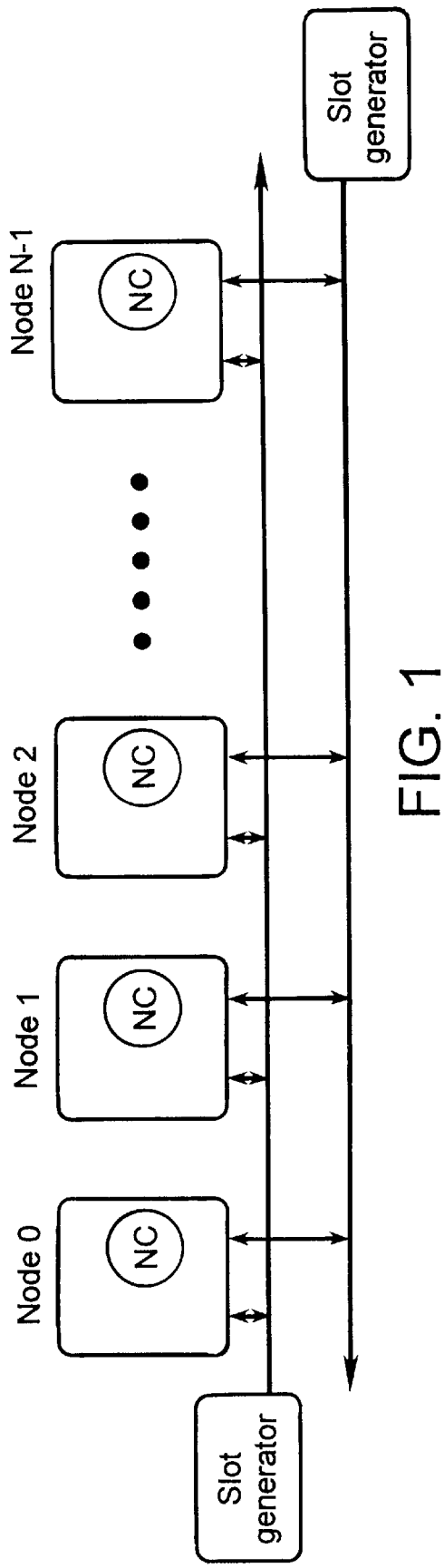
FIG. 1 illustrates a dual-bus DTM network.

First, the DTM MAC (Medium Access Control) protocol will be described. The basic topology of a DTM network is a bus with two unidirectional optical fibers connecting all nodes as is showed in FIG. 1. Several busses with different speeds may be connected together to form an arbitrary multistage network. In the current prototype implementation, buses can be combined into a two-dimensional mesh. A node at the junction of two buses can synchronously switch data slots between the two busses. This allows for efficient switching with constant delay through the node. The primary communication abstraction in DTM is a multi-rate, multicast channel.

Figure 2:
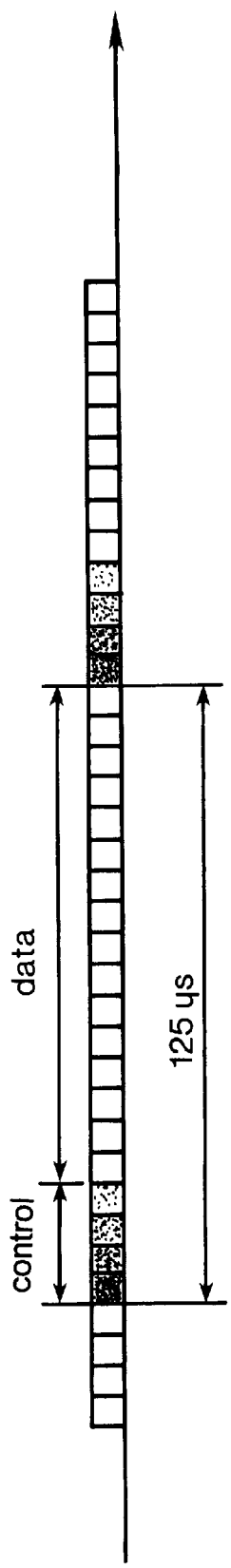
FIG. 2 illustrates a DTM 125 µs cycle with a home node defined for each data slot according to the invention.

The DTM medium access protocol is a time-division multiplexing scheme. The bandwidth of the bus is divided into 125 $\mu$s cycles, which in turn are divided into 64-bit time slots (or slots for short) as illustrated in FIG. 2. The number of slots in a cycle thus depends on the network's bit-rate; for instance, on a 6.4 Gbit/s network there are approximately 12500 slots per cycle.

The slots are divided into two groups, control slots and data slots. Control slots are used to carry messages for the network's internal operation, such as messages for channel establishment and bandwidth reallocation. The data slots are used to transfer user data and are not interpreted by intermediate network nodes. Intermediate nodes are nodes between the source and destination.

In each network node there is a node controller NC, which controls the access to data slots and performs network management operations, such as network start-up and error recovery. The main tasks of the node controller are to create and terminate channels on demand from users, and to manage network resources in response to user requests and in the background.

Control slots are used exclusively for messages between node controllers. Each node controller has write permission to at least one control slot in each cycle that it uses to broadcast control messages down-streams to other nodes. Since write access to control slots is exclusive, the node controller always has access to its control slots, regardless of other nodes and network load. The number of control slots a node use may vary during network operation.

The network is not restricted to a dual-bus, but can be realized by other kind of structures, e.g. a ring structure with an arbitrary number of nodes. The transmission media can besides to optical fibers be coaxial cables or any other high bandwidth transmission media. Hereafter the transmission media will be referred to as optical fibers. The bandwidth of the DTM dual bus in the preferred embodiment is divided into 125 $\mu$s cycles, which in turn are divided into 64-bit time slots. The invention is not restricted to DTM networks with this values, but can be used in networks with cycles and slots of arbratry sizes.

Principles for resource management (called token management) will be described below. The majority of the slots in a cycle are data slots. Access to data slots changes over time, according to traffic demands. Write access to slots is controlled by slot tokens (or tokens for short). A node controller may write data into a slot only if it owns the corresponding taken. The token protocol guarantees the slot access to be conflict free, which means that several nodes do not write data into the same slot.

Control messages for channel establishment and bandwidth reallocation carry set of slots or tokens as parameters. However, a control message is 64 bits and can therefore have only a small number of parameters. This means that if a user requests a large bandwidth transfer, it may be necessary to send several control messages to create the channel. This introduces extra access delay and consumes signaling capacity.

We are considering several mechanisms to decrease the amount of information that needs to be sent during channel creation and token reallocation. The first optimization in token management is to introduce block tokens. A block token is transferred in a single control message and represents a group of tokens, but can only be used for particular combinations of tokens. For instance, in the simulator a block token is denoted by a slot number and an offset giving the number of contiguous slots in the group. The block token optimization assume that the token pool is not fragmented into small pieces. This will be referred to as fragmentation of the token pool.

Figure 3:
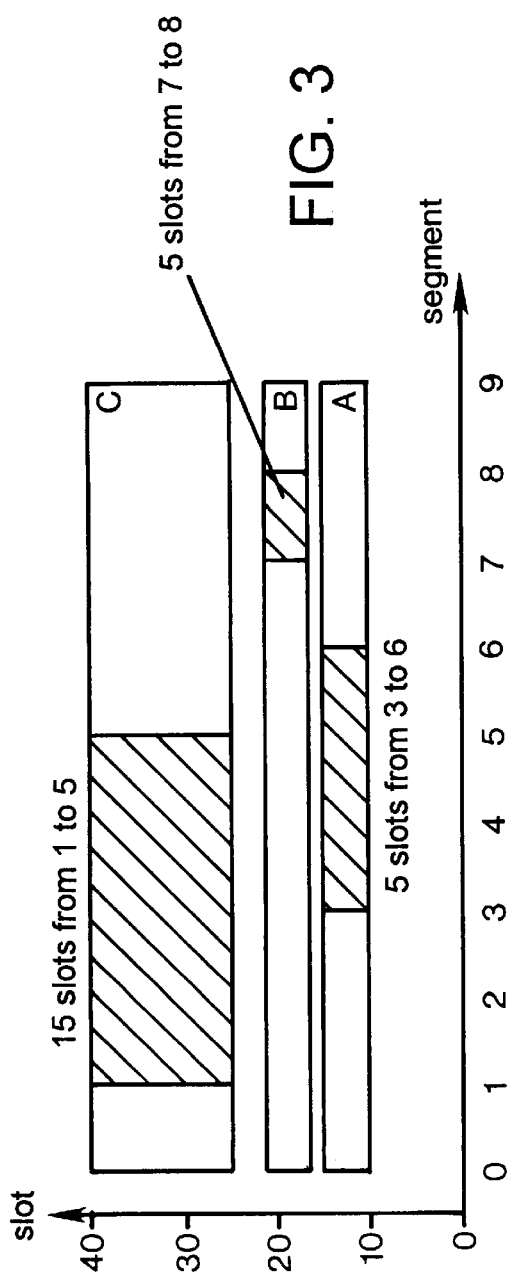
FIG. 3 illustrates a token map showing slot number and segment.
Figure 4:
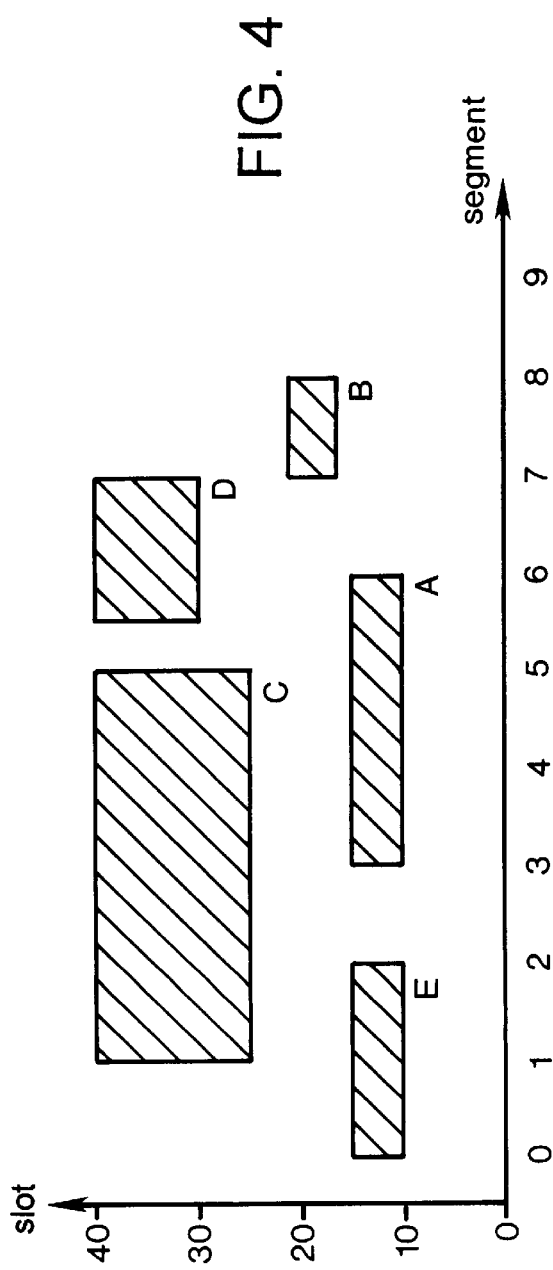
FIG. 4 illustrates a slot-segment map showing reuse of slots according to the invention.

The token protocol guarantees that a data slot can never be used by two nodes simultaneously on the bus. Sometimes this protocol is too conservative. FIG. 3 shows an example of how three tokens (A, B, and C) are reserved for three channels. Nodes are connected by bus segments and channels typically use a subset of the segments on the bus (gray color) and the rest are reserved (white color) but left unused and thus wasting shared resources. A better alternative is to let channels only reserve capacity on the segments between the sender and the receiver as the example in FIG. 4. A single slot may in this case be used multiple times on the bus. Channel D and E are using the same slots as channel A and C but on different segments. This is referred to as slot reuse. Slot reuse enables simultaneous transmissions in the same slot over disjointed segments of the bus.

Slot reuse is a general method to better utilize shared links in ring and bus networks. The slot reuse algorithms in DQDB (Distributed Queue Dual Bus), Simple and CRMA ( Cyclic Reservation Multiple Access) depend on control information in the slots. Buffer insertion networks when combined with destination release as in METARING may reuse capacity of individual links and resolve eventual contention by delaying the incoming packet stream through an elastic buffer.

With slot reuse, the access scheme complexity is increased, regardless of whether it is done in hardware as in DQDB, Simple, and CRMA; or in software, as in DTM. When implemented in systems other than DTM, slot reuse also add complex hardware to the critical high-speed path through a node and therefore increases the node delay.

To allow slot reuse in DTM the block token format is according to the invention extended to include parameters describing the segment(s) it is representing. The token management protocol is also according to the invention modified to avoid conflicts in the slot number dimension as well as the segment dimension. The most important assumption is that no hardware changes to the original prototype implementation where allowed or needed. The performance gain is also quite clear: on a dual-bus where source and destination pairs are uniformly distributed it has been shown that throughput may be increased by a factor of two. The performance gain can be even higher in other network designs; e.g. in a double ring structure with source and destination nodes uniformly distributed throughput may be increased by a factor of four. Having nonuniformly distributed source and destination nodes the gain may be much higher.

The potential drawback of slot reuse in a DTM network however, is the higher algorithm complexity and eventually higher load on the node controller and signaling channels (especially if the average channel duration is short).

Two token management schemes have been evaluated. The first and simplest is to let a single node controller manage all free tokens for one fiber. This sort of centralized server mechanism has also been used in systems such as CRMA, where the head-end node distributes the fiber capacity to all other nodes. The simulator was configured so that for each fiber a node one third of the distance from the slot generator was token server (with 100 nodes on a bus node 33 and 67 will be token servers). This corresponds to the mid-point of demand for each of the two unidirectional fibers such that a token manager will have the same amount of traffic on both sides.

Each time a user request arrives at a node, the node first requests tokens from the manager and then locks them throughout the channel life time. When the user issues a request to disconnect the channel the tokens are returned to the manager immediately. All requests are delayed during the token request and accesses are serialized through the central manager.

The distributed token manager is fundamentally more complicated than the centralized. We tried to keep it as simple as possible. In our method each node regularly broadcasts status information about how many free tokens it has. The other nodes store this information in their status tables. A node that wants more capacity consults its status table to decide from which node to request slots. The protocol on the initiating side works as follows. When a user request arrives to a node:
1. If the node has sufficiently many free tokens to satisfy the request, it allocates the requested amount of slots to the user, and starts the channel by sending a channel establishment message to the destination node, and then transmitting data using the reserved slots.
2. Otherwise the node marks its available tokens as being reserved, and then checks its status table: if the total amount of free tokens in the network is not enough to fulfill the request, then the request is rejected (blocked). Otherwise the node requests tokens from nodes with unused capacity.

If one of these nodes receiving a token request does not have the requested amount of free slots, it still gives away all of the slots it has. In any case, it sends a response back to the requesting node. A node fulfills incoming requests in strict FIFO order.

When a node receives a response to a token request, it marks the slots it receives in the response (if any) as being reserved. When the node has received responses to all requests it has sent, it either starts the channels or rejects the user request, depending on whether or not it has acquired sufficient capacity. If the user request is rejected, the reserved slots are marked as free again.

At startup all free tokens are evenly distributed among the network nodes and each node takes at least one of its free tokens, moves it (them) to the active state and declares it (them) to be a control slot. User requests may now be accepted and tokens can be moved between nodes on demand.

A weakness with this scheme is that slot reallocation is only triggered by user requests, and user requests are delayed by pending token reallocation. An optimization we have implemented to remedy this is to also perform slot reallocation in the background. This results in less need to reallocate tokens for small to medium sized requests.

The pool of free tokens may be distributed in other ways than evenly to increase reallocation success rate and utilization. If fewer nodes are managing the pool, channel blocking decreases as a result of a lower probability of token reallocation failure.

The complete token pool is in this case distributed proportionally (nodes close to the slot generator get more tokens than nodes far away from it) among all nodes. Token transfers may occur between any pair of nodes instead of always involving the server node. When the local node contains enough tokens to fulfill an arriving user request, the request may be accepted without any token reallocation. Furthermore, as long as the arriving user requests are well matched to the pool distribution no reallocation will ever be necessary.

Several questions need to be answered before deciding how to distribute the token pool. The following issues are addressed:
1. When local resources in the node are not enough to satisfy a user request, which other node should be asked for more tokens?
2. If a node asks for tokens from several nodes, how many tokens is it going to ask for and should the node reject the channel if it receives a fraction of the requested capacity?
3. If tokens move freely among the nodes, will the token pool be fragmented into small pieces and render the block token optimization scheme useless?

Status messages were decided to be used to distribute information about the pool of free tokens. Status message information is used to help a node choose a suitable node when asking for more resources. This method addresses the first question above.

Our scheme works as follows. Each node regularly broadcasts status information about how many free tokens it has. The other nodes store this information in their status tables. A node that wants more capacity consults its status table to decide from which node to request slots. The broadcasted state information gives an approximate and dated view of the current state of token information, so token requests may be rejected because they were sent to nodes that no longer have tokens to give away.

Status tables are "soft" information in the sense that the system will work even if they are out of date or not available. They should, however, improve the success rate of reallocation procedures.

When comparing basic performance of the centralized (FIG. 9) and the distributed (FIG. 12) token manager we see that there is a new type of rejections that is frequent in the distributed version when resources are still unused in the system.

A node uses the status table to pick node(s) from which to request tokens. When the request reaches the target node the amount of available capacity may have changed and a smaller amount than requested may be returned to the requesting node, resulting in a user rejection.

This behavior results in even more unnecessary token movement and therefore also increases the probability of other nodes receiving fewer than requested tokens. The tokens that are moved in this case are also locked and unused during the transfer.

If the pool is distributed proportionately among a large number (100's) of nodes, the average pool size will be relatively small. When the load is high, the number of free tokens in pools decreases even further. If nodes also create and destroy channels at a very high rate, the amount of free capacity in individual nodes jumps between having a small amount of capacity and having none. Now, if the average capacity requested by a user is large compared to the number of free tokens of a node, several nodes need to be asked to fulfill the request. At this point the probability that one of the requested nodes do not have any free capacity increases, leading to a user rejection.

There are several ways to address this problem without going back towards a centralized model. First, we may not give away any slots at all when the complete request cannot be fulfilled. This protocol applies if only a single node is asked for free tokens but if several nodes are asked it may still result in tokens being moved or locked unused. Second, if after a token request, we receive fewer tokens than we requested we may simply retry the token request procedure several times. This will increase the probability of accepting a user request and that received tokens will be used. The cost of retry will be increased signaling and increased access delay, and it may worsen performance in an overloaded network. Also user retry introduces longer set-up delay for requests that are retried. Third, the user may sometimes want to accept a channel with less than requested capacity instead of being rejected.

Figure 5:
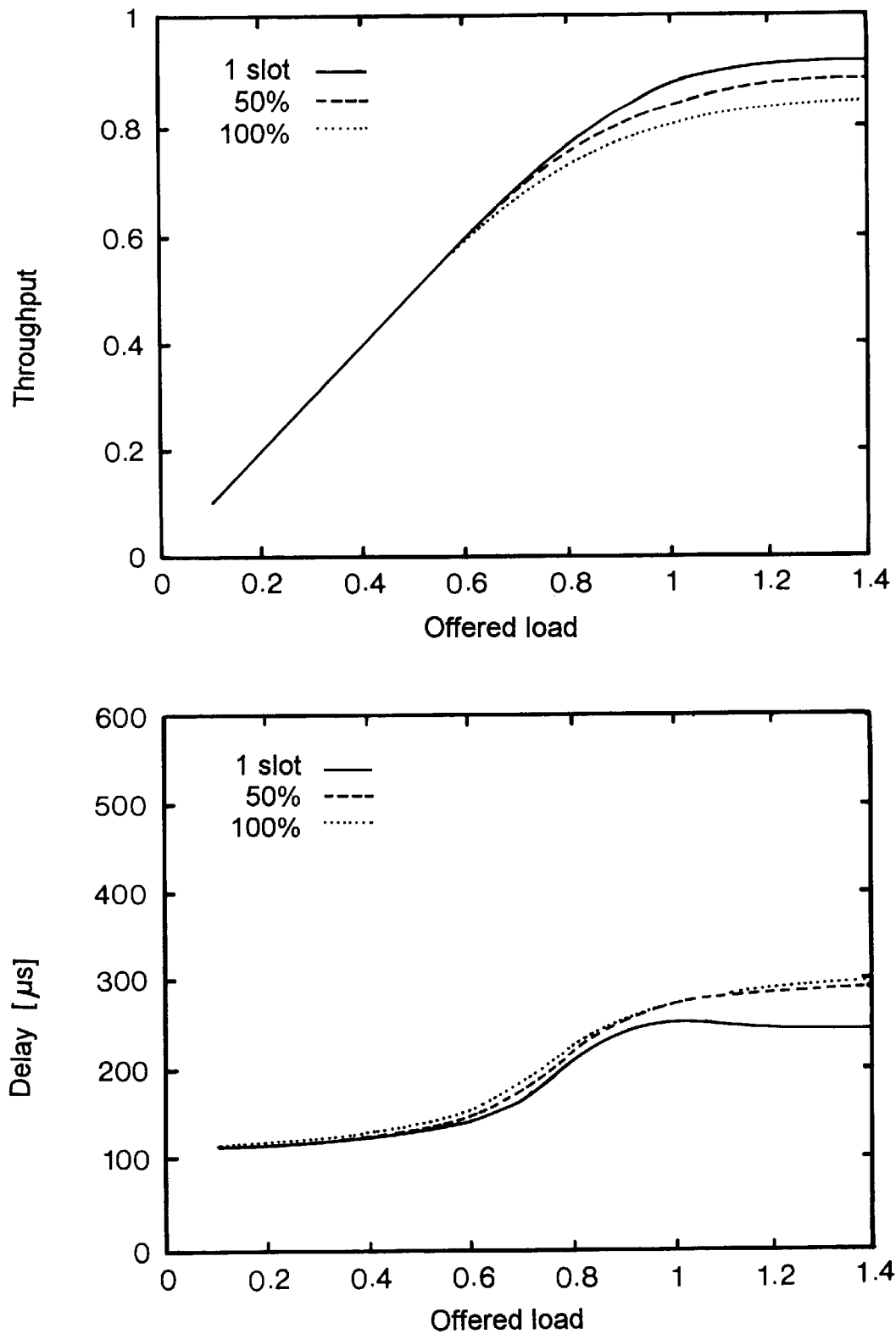
FIG. 5 illustrates the performance (throughput and access delay, respectively, versus offered load) for small user requests (16 kbyte) and for different minimum acceptable capacities as simulated using a distributed token server according to the invention.
Figure 6:
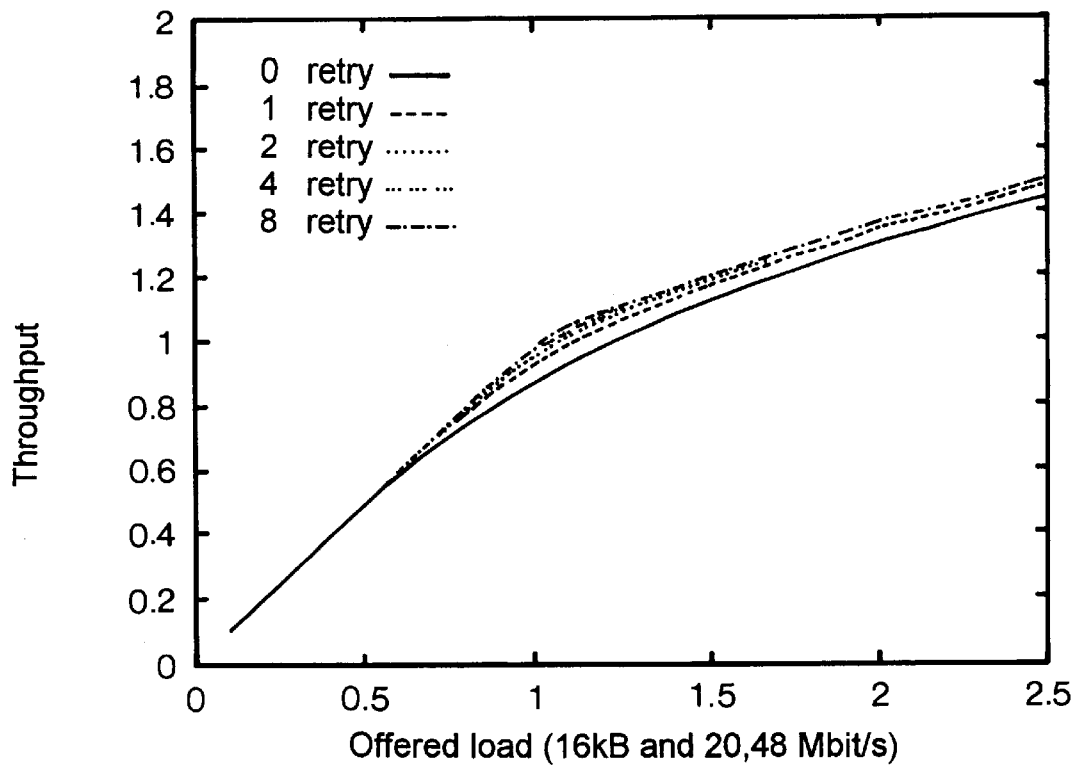
FIG. 6 illustrates the performance for small user requests (16 kbyte) and for different number of allowed retries before request blocking as simulated using a distributed token server according to the invention.
Figure 6:
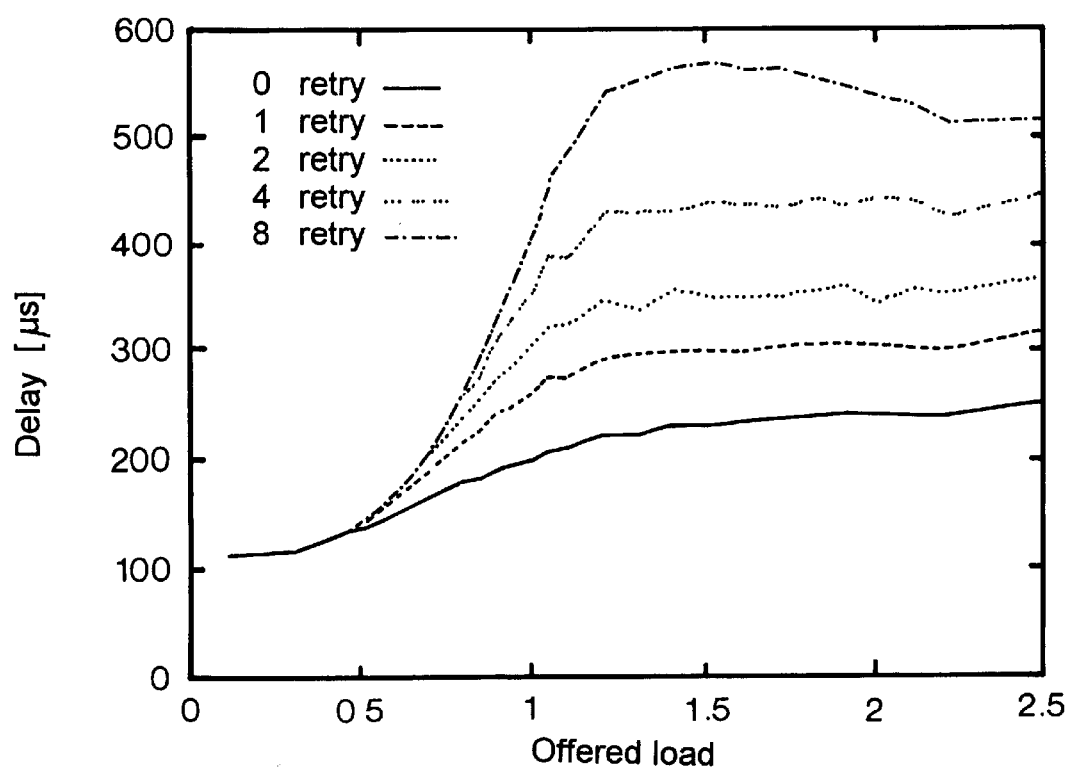

If, for example, a user receives 50% of the requested he may want to accept. In FIG. 5 throughput, which is the ratio between transported user data and total number of bits transmitted by the fibers, and access delay, which is the time from the arrival of a user request to the sending of the first data of the request, for small (16 kbyte) user requests with various minimum acceptable capacities [100% (40 slots), 50% (20 slots), and 5% (1 slot)] are plotted versus offered load. A lower average minimum acceptable bandwidth will result in higher throughput. In FIG. 6 is shown the performance that results if user (requesting a 16 kbyte data transfer) retries up to 8 times before the request finally is blocked. Utilization increases (and blocking decreases) at the cost of more signaling and longer delay. Retrying a large number of times is counter productive if it happens frequently.

Clearly the benefits of a flexible user request policy, is lower probability of being rejected and higher overall throughput. Either of the configurations presented in FIG. 5 and FIG. 6 may be decided at arrival time of a request. A user that has strict demands on the capacity for a channel may retry until enough capacity is allocated, but another may rather accept a channel with less then the requested amount. For the rest of the simulations presented here the minimum acceptable bandwidth is defined to be 50% of the requested capacity.

In the general case, the average number of contiguous free blocks in a node is small, due to the random movement of tokens and the varying capacity of users request. This fragmentation renders the block token optimization practically useless, and the access delay is relatively long (milliseconds) for high capacity channels. To make block allocation efficient it is necessary to reduce fragmentation of free tokens, otherwise fragmentation will be by far the main contributor to access delay for high bandwidth channels at moderate to high load. Low capacity channels will almost always have a very short channel establishment delay independent of the current amount of fragmentation. In the case of slot reuse, the fragmentation problem is even worse, as fragmentation may occur in both slot (time) and segment (space) dimensions (see FIG. 4). This is in the centralized server version a particular application of the general dynamic storage-allocation problem. In the distributed token manager most of the fragmentation is a result of using many free pools (one for each node). Two free adjacent tokens can only merge if they are found in the same node.

A distributed scheme that tries to avoid fragmentation if possible and increases the average block size of free tokens in the nodes has been implemented. The scheme is used both with and without slot reuse.

The scheme works as follows:
1. Define a home node for each token at network startup and distribute tokens in such a way so tokens sharing the same home node will always define a continuous slot range. This results in a large average token area in the token map shown in FIG. 4.
2. When two slot-consecutive tokens with the same slot or segment range exist in the free pool merge them into a single token (sometimes a recursive split and merge operation is needed). When doing a merge always prioritize segment merge before a slot number merge. (The reason for this is that tokens spanning over just a few segments are less useful to other nodes than tokens spanning over many segments) . Two segment-consecutive tokens, representing at least partly the same slot range and existing in the free pool of a node, are splitted to obtain segment-consecutive tokens representing the same slot range, which are merged into a single token.
3. When a node get a token request from the local user or a remote user, pick a token from the token pool using a best-fit algorithm in slot number and segment number dimension (see FIG. 4). The value of a token is calculated as the area of a token in the token map and we tries to pick the token with the smallest area that fulfill the requested capacity. A cost function can also be defined as a function of e.g. number of slots, number of segments, location of slots and location of segments, which function should be minimized, however, still fulfilling the requested capacity. This mechanism can also be used by the servers when using a centralized token manager.
4. When a node needs to request tokens from other nodes it does not ask for small chunks from several nodes if it is possible to ask for larger chunks from fewer nodes. The status tables provide this information. Transfer of tokens is therefore more efficient, and there are fewer establishment messages and less fragmentation.
5. Free tokens are sent back to home nodes when they have been idle for a significant time or after a long transfer.

This scheme returns tokens to "home" nodes as a way to increase the probability that two consecutive tokens can be merged in the free list which decreases fragmentation. If home node "gravity" is too strong the scheme will result in less sharing of resources and unnecessary signaling. If it is too weak, fragmentation will still remain a problem. The "gravity" may be changed during the operation of the bus.

To evaluate the defragmentation mechanism we did another set of simulations. Three different simulators [A, B, C] were configured. Simulator A was configured to have no fragmentation at simulation start time and to use the defragmentation scheme described above. B did start with maximum fragmentation of the complete resource pool. All tokens had a single slot and no tokens in the "home" nodes before the defragmentation mechanism was turned on. Finally, simulator C was started without using the defragmentation mechanism and with the pool having maximum fragmentation. In all cases slot reuse were turned on and load was defined to be 80%.

Figure 7:
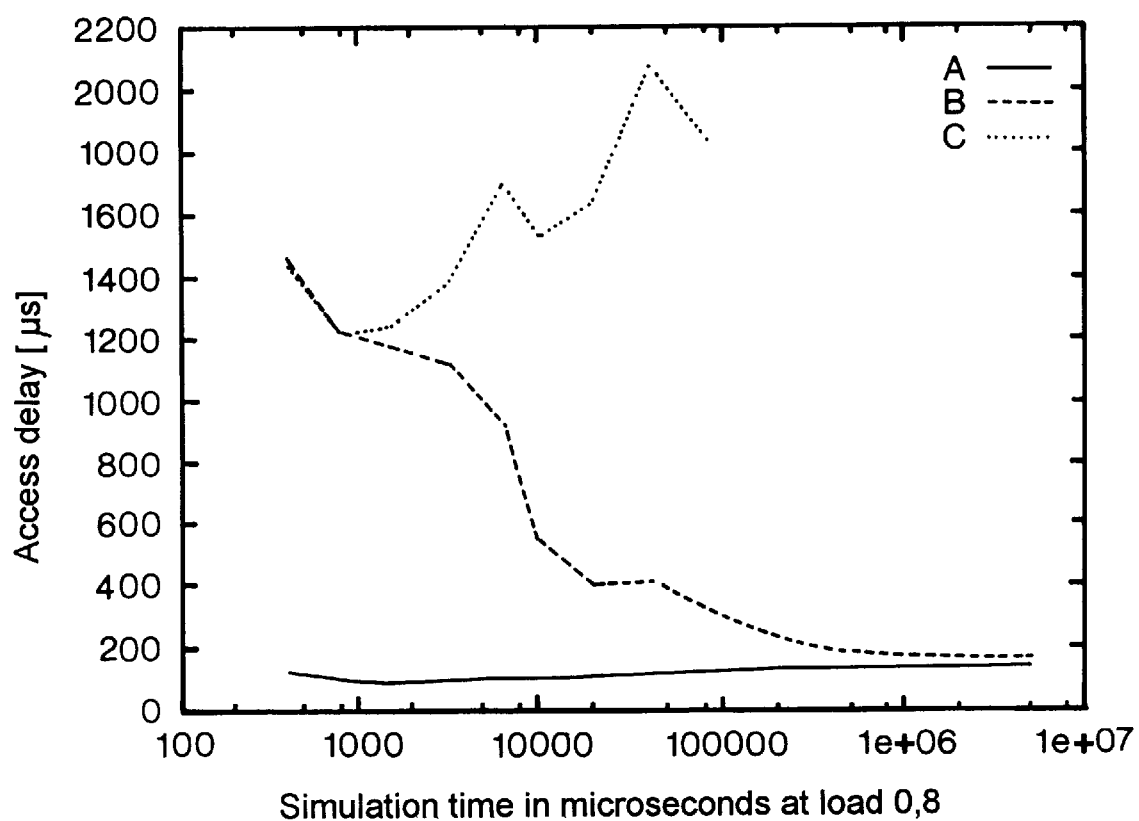
FIG. 7 illustrates access delay as a function of simulated time using A) the defragmentation scheme according to the invention and no fragmentation at simulation start, B) the defragmentation scheme according to the invention and maximum fragmentation at simulation start, and C) no defragmentation scheme and and maximum fragmentation at simulation start.

In FIG. 7 is shown the access delay as a function of simulated time for a 10 km network. Simulator C started with a long access delay and the delay increased as the signaling channels became overloaded and message queues grew. Simulator B using the defragmentation mechanism starts just as bad as C but already after 10 milliseconds the average access delay is below 500 microseconds. Later when one second of simulated time has passed the B curve almost joins A i.e. it converges on the performance of the simulator starting without any fragmentation at all. The convergence speed depend on the amount of free capacity in the network and therefore also on load. The load during all these simulations was 80%. The defragmentation mechanism clearly improves the access delay and also makes the block token optimization meaningful in the distributed implementation.

Two kinds of performance measures are of main interest: utilization and access delay. Utilization is the portion of the nominal network capacity that is actually used for data transfer, and is a measure of the efficiency of the network. Access delay is the time from the arrival of a user request to the sending of the first data of the request, which is an important measure for how well computer communication traffic can be supported.

There are two main factors that influence utilization in DTM. First, each node is assigned signaling capacity in the form of control slots, which means that there are fewer slots available for data transfer on a bus with many nodes, given fixed link capacity. Secondly, token reallocation incurs overhead since while a slot token is being reallocated between nodes, the corresponding slot cannot be used for data transfer.

Access delay depends mainly on the load on the control slots, and on how many control messages need to be sent to establish a channel. The access delay is typically a summation of a few delays: e.g. node controller processing delay [5 $\mu$s], delay in finding and allocating free tokens [100 $\mu$s], waiting for the first available control slot to pass [50 $\mu$s], and finally waiting for the first allocated data slot to be filled with user data [62.5 $\mu$s]. In addition, messages are delayed in queues at the input to node controllers waiting to be processed. In the simulations presented below the average delay is up to a few hundred microseconds.

Results from simulations where DTM is exposed to traffic patterns that are more like the relatively short-lived transfers (4–4000 kbyte) seen in computer communication will be presented. Traffics are with bursty inter-arrivals, client-server oriented as well as with exponentially distributed arrivals. In the simulation model, each transfer starts with the arrival of a new "packet" of information. The node controller tries to allocate resources for the transfer, transmits the data and finally releases the channel. This is a simplification of the mechanisms in a real system, where channel set-up, data transfer and channel teardown are independent operations initiated by the user. For example, a user that knows that a transfer is about to take place may "hide" the channel establishment delay by requesting a channel in advance, so that it is already established when the transfer starts. Between a setup and teardown, the capacity of the channel is completely reserved for the user. The most straight-forward use of the channel is for a single transfer, such as a file transfer or a video transmission.

Depending of the characteristics of the application, it is possible to optimize the usage of the channel. For instance, a channel may be used to transfer sequences of higher level messages such as ATM cells or IP packets (this is similar to using a single VC (Virtual Channel) for all IP traffic in an ATM network). If the channel is a multicast channel, messages to different destinations can be multiplexed onto the channel. This means that each message will reach every receiver on the multicast channel and receivers must be able to filter messages. An alternative solution is to create and destroy a channel for each message, but reserve the tokens between messages so that the tokens are readily available for the next message in the sequence.

This type of user behavior is not incorporated in the simulations, since they are optimizations for particular applications. Instead attention is paid to how the network performs without user level optimizations.

The sender may start sending data as soon as the resources are allocated, even before the receiver receives the channel establishment message. This is called channel establishment. The receiver will eventually respond with a control message to accept or reject the channel.

User requests have the following parameters:

Packet size which is the amount of user data transferred between channel establishment and channel release. We simulate packet sizes from a few kbytes up to a few Mbytes.

Requested capacity for a channel, which is the number of slots that a node tries to allocate. For all the simulations in this paper the requested capacity is fixed to 40 slots or 20.48 Mbit/s.

Minimum acceptable capacity. A node blocks a request if it cannot allocate this number of slots. This is normally set to 40 or 20 slots (100% or 50% of requested capacity).

Source address.

Destination address.

The source and destination addresses are generated randomly (all nodes with the same probability) and user inter-arrival times are exponentially distributed. The simulations investigate the effect of signaling capacity and slot reallocation overhead on utilization, channel set-up delay, and blocking. We simulate varying traffic conditions, for a topology with the following characteristics:

A dual bus network with 100 nodes. Even though it is theoretically possible to connect many more nodes to a bus, we think that management of networks with more than 100 nodes on a bus may be infeasible. With 100 nodes the capacity sharing is significant enough to exercise and test the token management protocol.

The capacity of each bus is 6.4 Gbit/s. We believe this is realistic for what is realizable within a year or two; 2.4 Gbit/s optical links have been available for a few years, and 10 Gbit/s links have been announced to appear soon on the market. 6.4 Gbit/s corresponds to 100 MHz slot rate, which is the rate at which the slot processing MAC hardware would operate this speed attainable with current CMOS technology.

The total signaling capacity is the same for all nodes but the slots are partitioned between the two fiber directions proportionally depending on where the nodes are located on the bus. The closer a node is to the slot generator the more control capacity is needed. The sum of the control capacity on both buses will however be the same for all nodes. In the network with two token servers, the servers has more control capacity and higher processing capacity than the other nodes.

The length of the bus is 10 km, which gives a large enough network that the effects of propagation delay are not negligible. Results from studies of the effects of propagation delay in simulations with different bus lengths are presented in FIG.'s 11 and 13.

Two different token management schemes are simulated: an asymmetrical scheme where all the tokens on one fiber are managed by a single token server and a symmetrical scheme where each node controller manages a small piece of the global token pool.

When analyzing the performance of the DTM dual-bus network the issue of maximum theoretical performance must be addressed and compared to the simulated performance.

The maximum theoretical performance is also used in this paper to compare the different schemes and implementations we are evaluating.

The maximum throughput of a dual-bus system without slot-reuse can be defined as twice the link capacity, given that both fibers receive the same traffic. In a system with slot reuse the system throughput also depends on the source destination distribution. To obtain this throughput for the dual-bus we used a Monte Carlo simulation where source and destination addresses were uniformly distributed (see left graph of FIG. 8) Comparing this with a DTM network (simulator configuration as defined below using a centralized token manager) where the user requests large transfers (4 MB at 20 Mbit/s capacity) and signaling capacity is not a bottleneck (see right graph of FIG. 8), utilization is close to the ideal case. Real traffic behaving like this is bulk-data transfers and audio/video streams. The differences that are shown are a result of: Some capacity is in DTM used for control slots lowering the available number of slots to be used by data transfers. The random generators for the DTM system do not generate exactly the same amount of traffic in upstream and downstream direction. This may result in blocking in one of the directions when capacity is available in the other. During channel establishment resources may be locked unused momentarily wasting some capacity.

In the case of central token manager the two managing nodes need more signaling capacity than other nodes (Eight times as many control slots to a server node than to other nodes are assigned).

Figure 9:
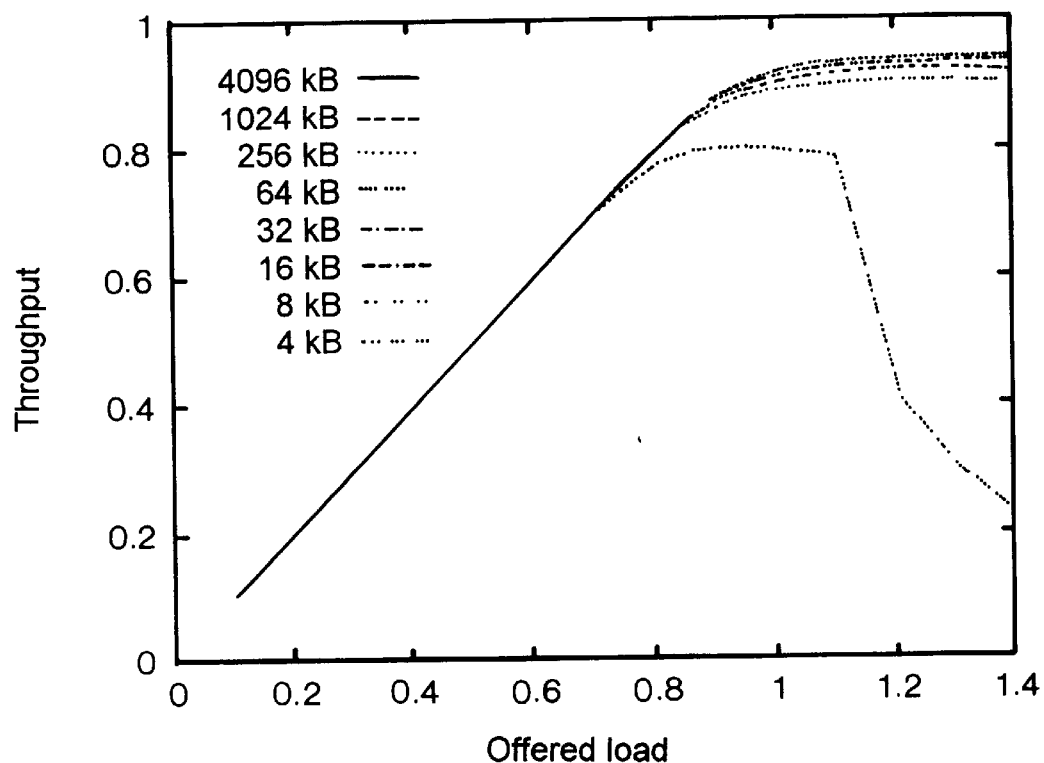
FIG. 9 illustrates the performance for different packet sizes as simulated using a central token manager in a 10 km long dual-bus DTM network without slot reuse.
Figure 9:
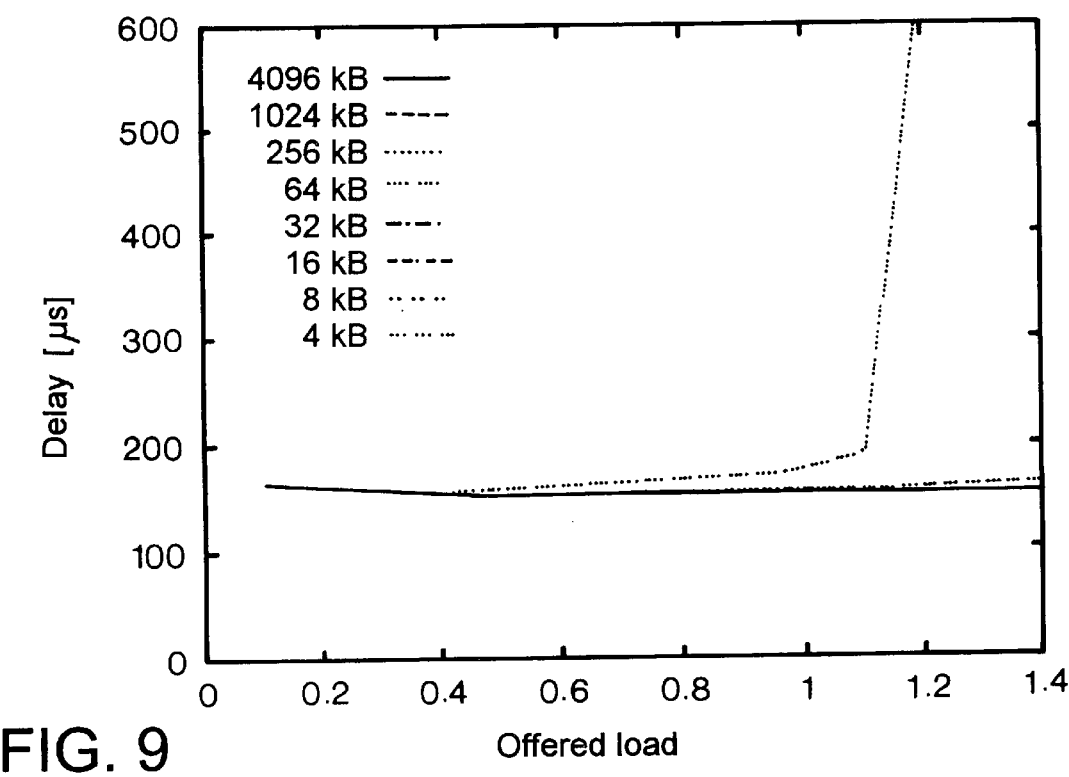

Results of the first set of simulations are presented in FIG. 9. User request 20 Mbit/s channels, inter-arrival times are exponentially distributed (generated by a Poisson process) and the simulations are performed with different packet sizes. If the full capacity of the channel cannot be allocated, the request is rejected and tokens are returned to the token server. Packet sizes vary from 4 Mbyte to 4 kbyte, at which point we begin to see throughput degradation.

Throughput degradation may occur if processing capacity in nodes or control channel capacity is too small. The server nodes may be especially overloaded. The result is that queues containing control messages start growing very big. The control tokens represent unused capacity, and therefore the throughput is degraded.

In the 4 kbyte per channel simulations, the control capacity is the limiting factor and if more control slots (signaling capacity) are added, 4 kbyte and even smaller packets can be more efficiently supported.

Figure 10:
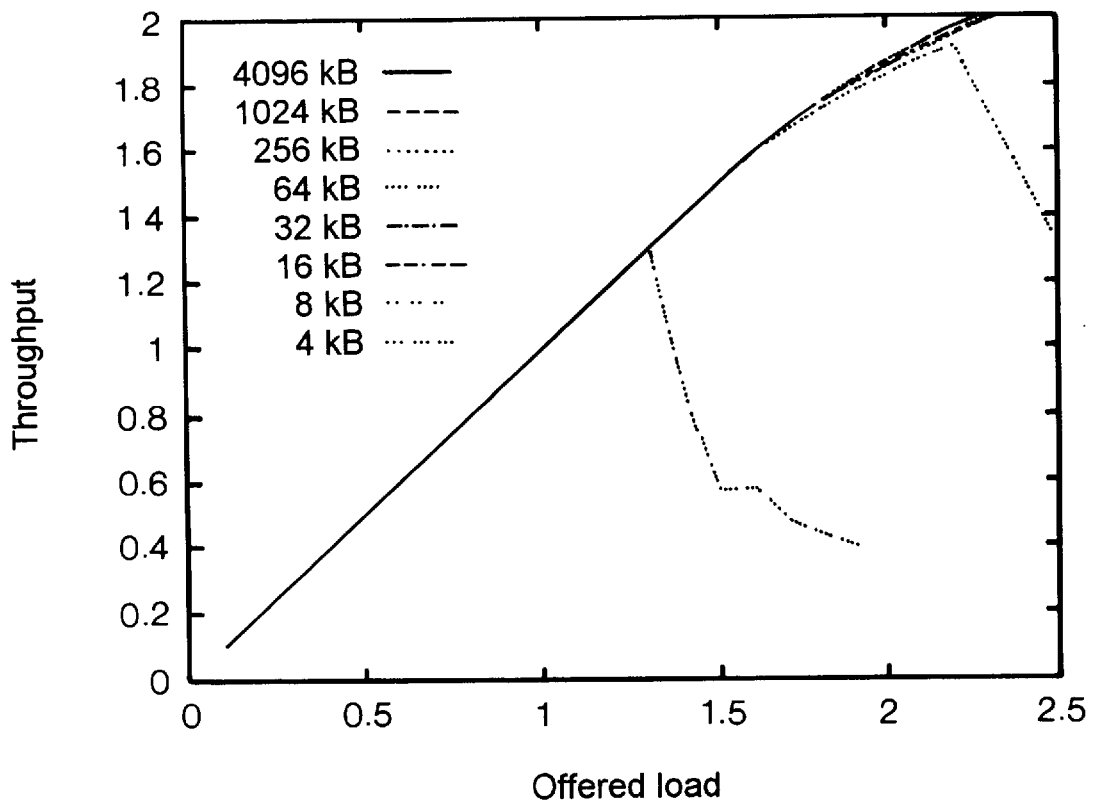
FIG. 10 illustrates the performance for different packet sizes as simulated using a central token manager in a 10 km long dual-bus DTM network-with slot reuse according to the invention.
Figure 10:
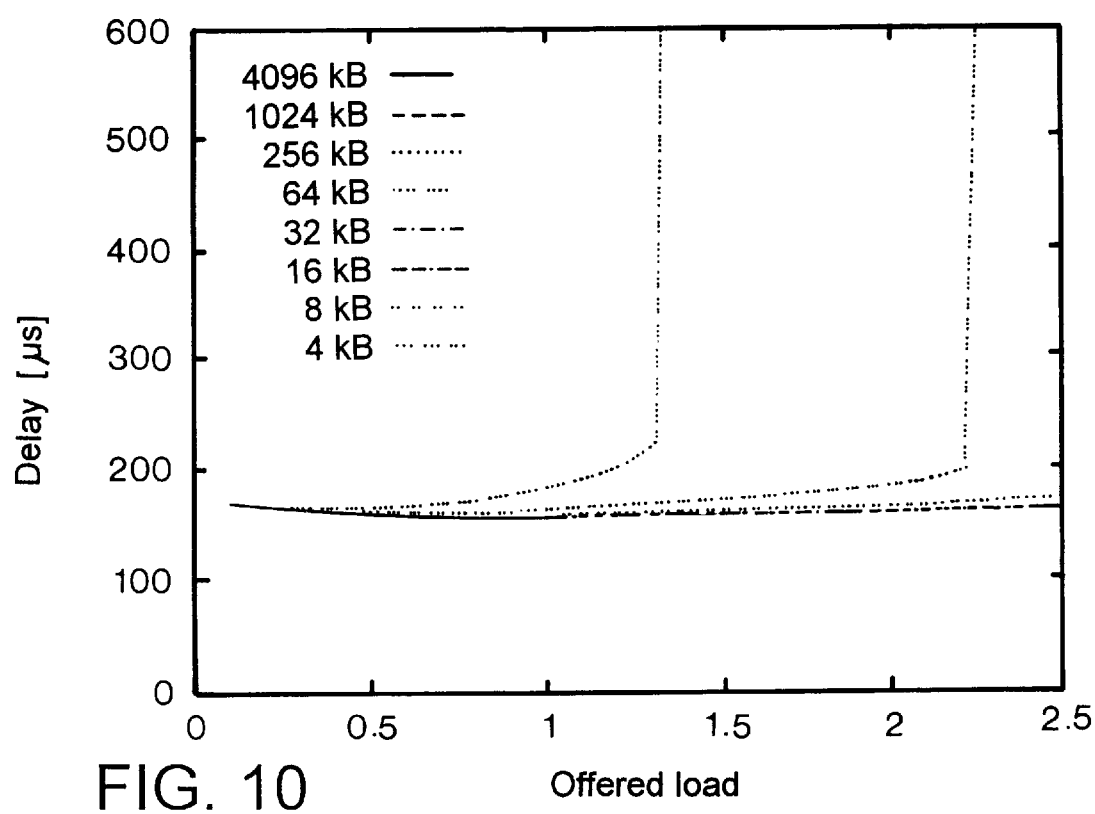

The next set of curves in FIG. 10 show how the slot reuse mechanism improves the performance of the system. Throughput increases by almost a factor of two before any significant number of channels are rejected. The uniform source and destination distributions of channels limits the amount of increased capacity gained by slot reuse. It has been shown that if the source and destinations are generated evenly, as we do, throughput may be doubled on a dual bus. In the simulations it may also be seen that beyond an offered load of 2.5 we may actually get throughput higher than 2.0. This level of throughput, however, can not be reached without some channels being rejected. The channels with the highest probability of being rejected are the ones that use many slots or segments. Therefore the system "filters" less greedy user requests and throws away the rest. This is normally not an acceptable behavior and we therefore do not investigate this any further. Throughput degradation occur at an offered load of 1 with the 4 kbyte transfers. Even if enough resources were available in the token server it is not possible to establish and destroy channels fast enough as the control channel is congested. Further is also seen a throughput degradation of the 8 kbyte simulations at an offered load of 1.8, for the same reason.

It may be concluded from the simulations in FIG. 10 that the slot reuse mechanism almost doubles the system throughput with only minor changes to the centralized token protocol as long as the control and server processing capacity is not a bottleneck. From the curves it can also be unexpectedly seen that access delay actually decrease when the load increase from 0.1 to 0.5. This is a result of how slots are assigned to a channel and not from a faster token request procedure. The time for it takes to request tokens from the server is strictly increasing.

Figure 8:
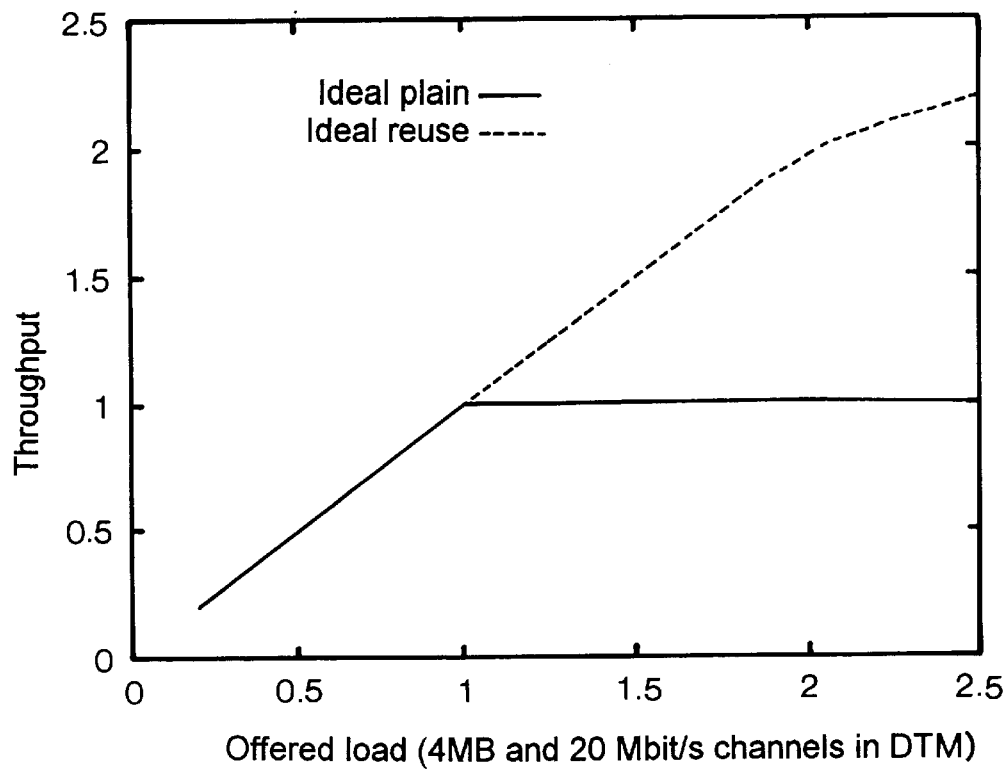
FIG. 8 illustrates theoretical dual-bus and DTM throughput versus offered load for a dual-bus DTM network with and without slot reuse.
Figure 8:
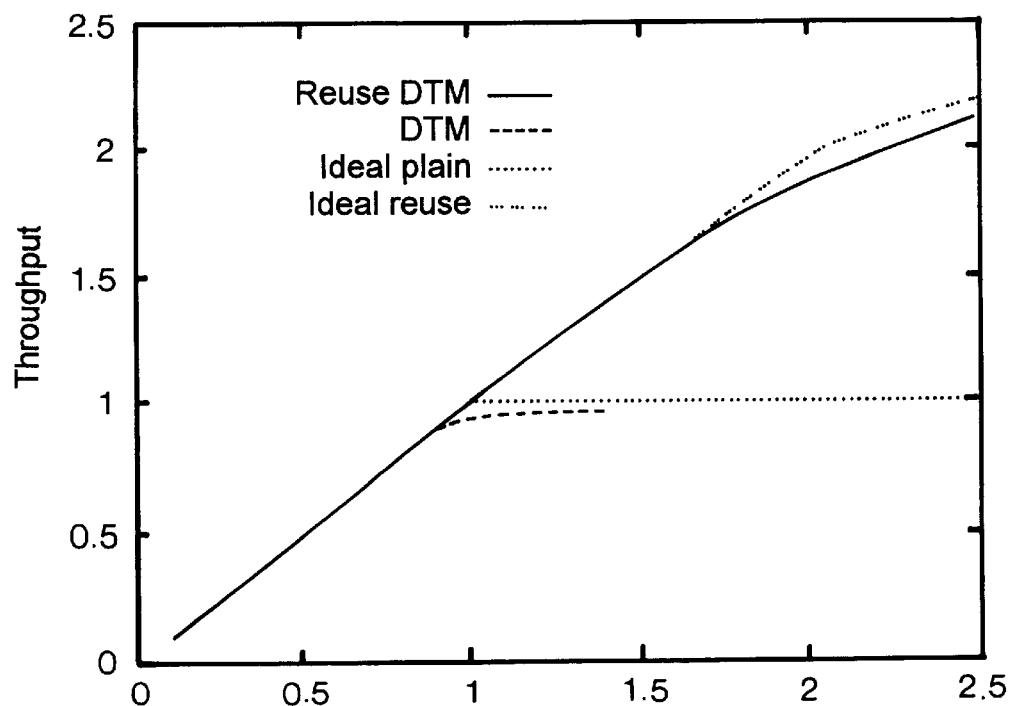

When comparing the DTM performance in FIG. 10 and the theoretical values in FIG. 8 it is seen that even short bursts (a few milliseconds duration) can be supported efficiently.

When a single token server is used, each channel establishment first requires a token to be requested from the server before the node can establish the channel. If the length of the bus is increased the token request will take a longer time and may therefore also limit the throughput and increase the access delay.

Figure 11:
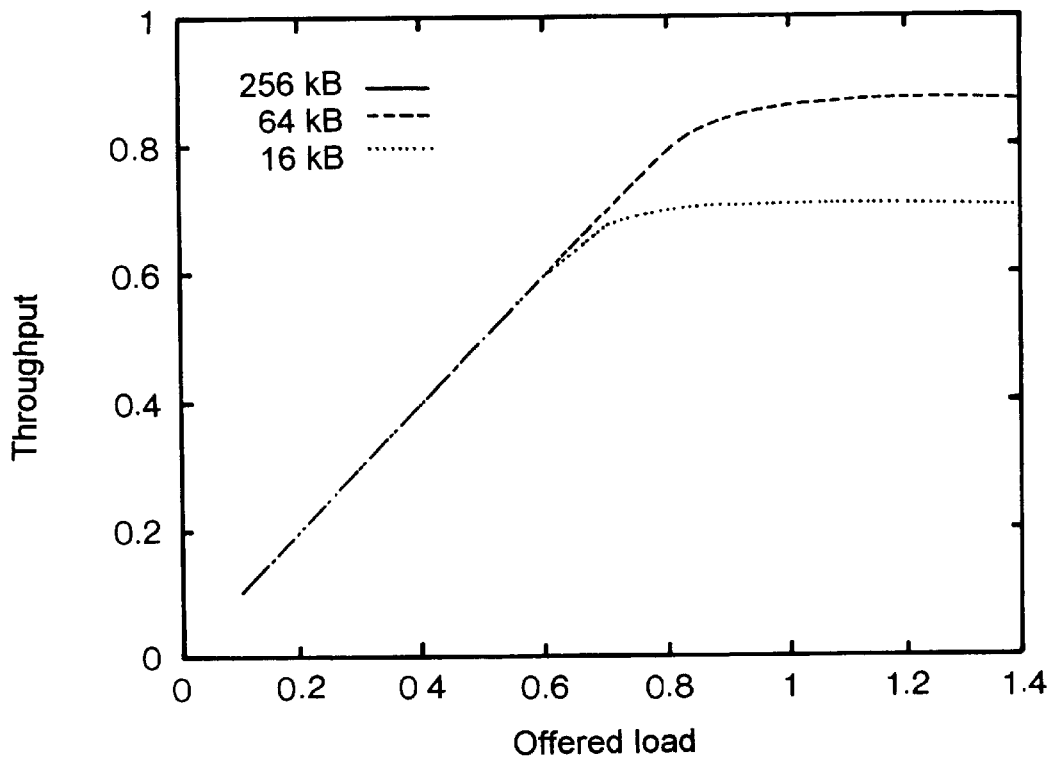
FIG. 11 illustrates the performance for different packet sizes as simulated using a central token manager in a 1000 km long dual-bus DTM network with slot reuse according to the invention.
Figure 11:
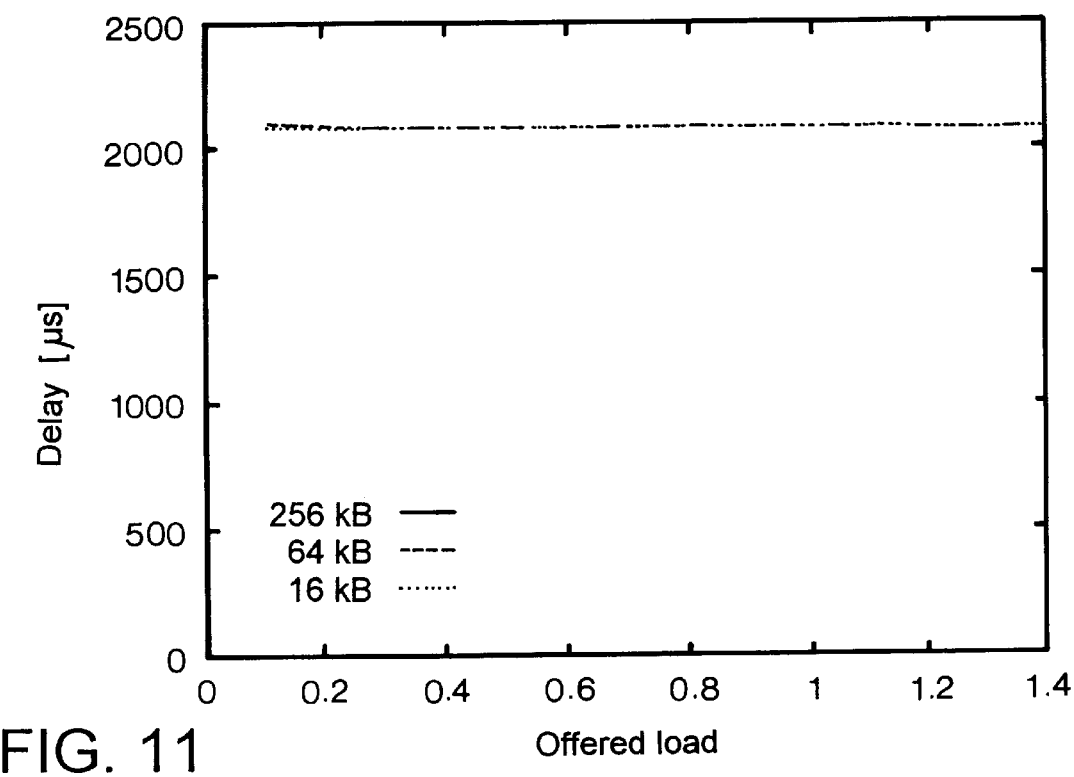

In FIG. 11 is shown the result from simulations, in which the length of the bus is increased from 100 to 1000 km (node to node distance is now 50 $\mu$s). Both access delay and throughput are now limited by the round-trip latency to the token server.

Access delay in this case depends on the distance to servers, but is independent of the transfer size. Utilization depends strongly on the transfer size as the establishment phase may be amortized over a long data transfer phase. Channels transferring large amounts of information such as 256 kbyte with a duration of one tenth of a second are still efficiently supported when the bus length is 1000 km.

Using a centralized token manager has several benefits. Clients may be simple as they only contain state information related to their own opened channels. Slot reuse is also simple and efficient, as the slot server has all of the free tokens to choose from when trying to satisfy a user request. The server may also implement other policy related functions such as admission control and fairness. The fragmentation of the free token pool in the server is normally very modest, resulting in very few connection establishment messages per channel even for high capacity user requests.

There are also drawbacks. A user that frequently establishes and destroys channels may introduce excessive signaling by always returning tokens after use, but then requesting the tokens again within a short time period. The processing capacity of the server node may get overloaded if there are many nodes on the bus or if the average packet size is very small. If the media length is very large relative to the product of bit-period, bits-per-packet and media velocity the round trip time to the server may also limit performance. Finally the server node contains state information that all nodes depend on to create channels. A server node failure may therefore affect all the nodes.

In next section the properties of a fully distributed token manager are simulated and investigated.

When evaluating the performance of the distributed token manager with slot reuse and defragmentation the same traffic and parameters are used as in the case of a central token manager, but with a policy whereby requests are accepted if 50% of the requested capacity can be allocated.

Figure 12:
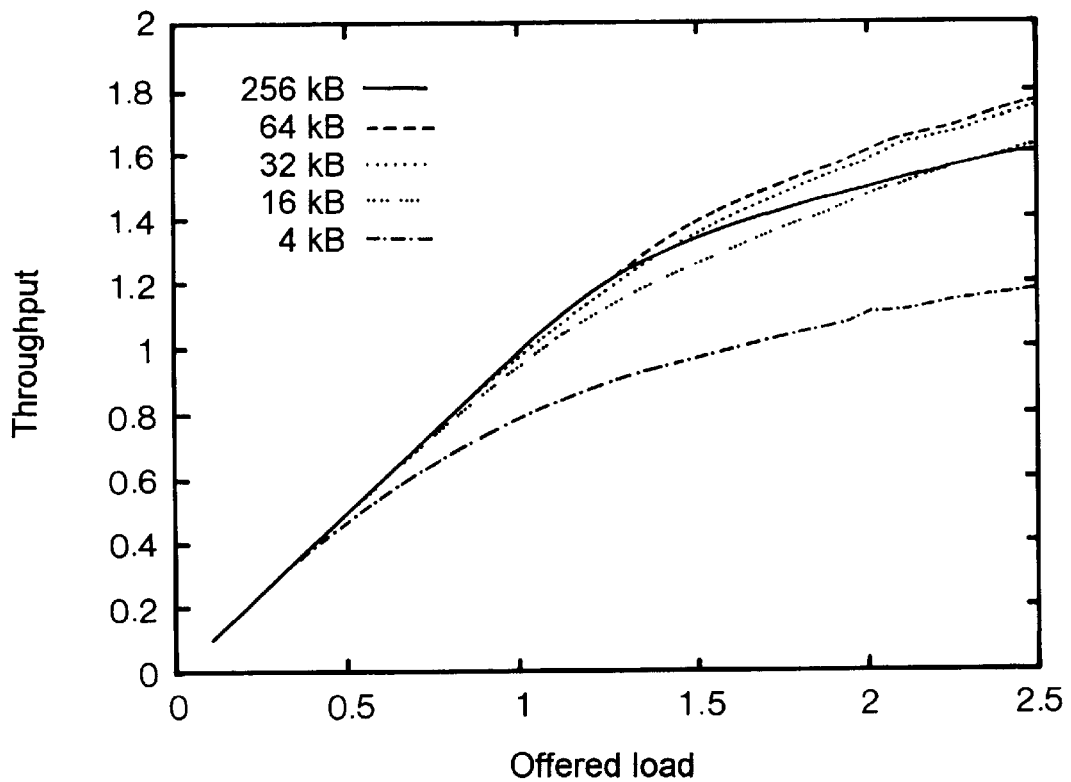
FIG. 12 illustrates the performance for different packet sizes as simulated using a distributed token manager in a dual-bus DTM network with defragmentation and slot reuse according to the invention.
Figure 12:
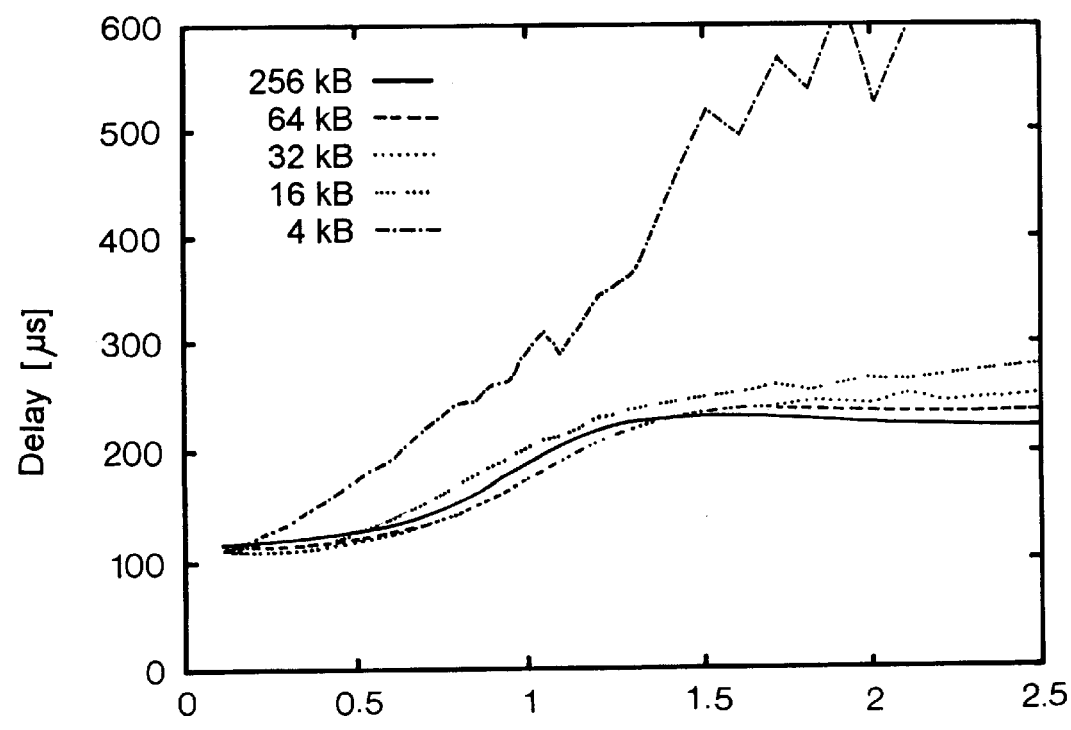

The results presented in FIG. 12 are from the simulator with slot reuse, a fully distributed token manager, status messages describing how much capacity a node owns, and the defragmentation scheme. All nodes have the same processing capacity and the processing load is much lower than what the servers in FIG. 10 receive. The dependencies between nodes are also much smaller resulting in a higher degree of reliability. The system performs better than any system not providing slot reuse but not as good as the centralized system described earlier.

When comparing the performance of this configuration and the centralized token manager in FIG. 10, one sees that blocking is higher and some requests may be blocked at much lower load in the distributed implementation.

One result not expected was that performance actually decreased when the packet size was increased! After checking the results again it was founded that a large average transfer size results in less movement of tokens and that the status information actually gives an even worse view of free resources in the network than for short transfers. In this case, a request is rejected if we do not think we will find any resources. This mechanism was introduced to avoid wasting control capacity when resources was exhausted.

The reason for this is that the status messages only describe "global" tokens covering all segments on the bus. A global token may be used by any node and is the only type of token in a DTM system without slot reuse. At a load higher than 1.00 a large number of tokens are segmented and the reuse scheme needs them on them being used by new requests. Therefore, the status message mechanism which is used, that was developed for a system without reuse, is limited in its ability to help new requests find free capacity, and can it the worst case result in higher blocking.

Figure 13:
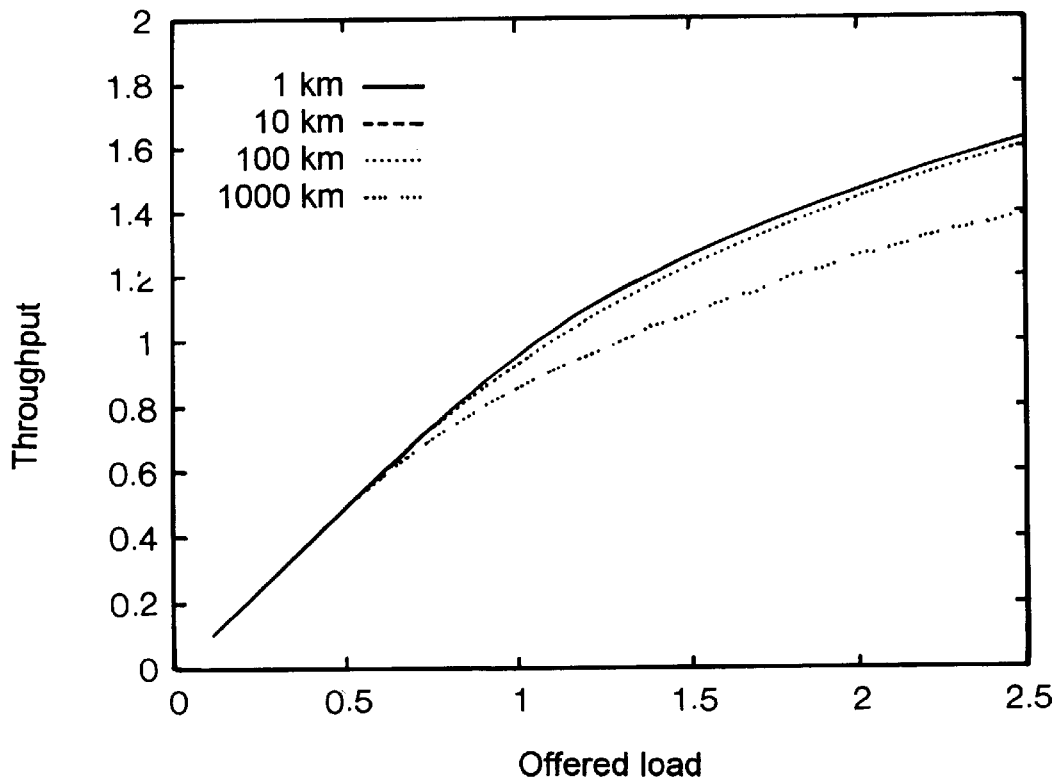
FIG. 13 illustrates the performance for different bus lengths as simulated using a distributed token manager with defragmentation and slot reuse according to the invention.
Figure 13:
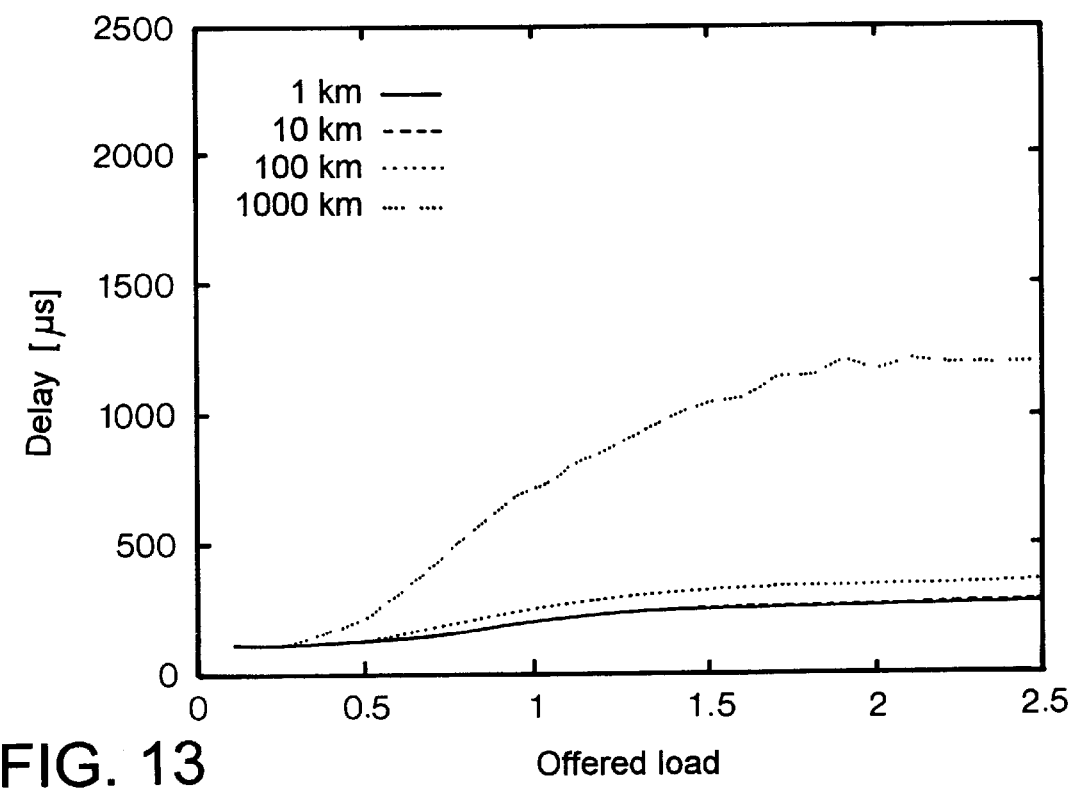

The throughput and access delay of the distributed token manager with bus lengths from 1 km to 1000 km is presented in FIG. 13. A small 16 kbyte packet is sent between establishment and tear-down of the channel, for large packets (100's of kbytes) the throughput performance of the system is much less affected of the bus length. The 1 km and 100 km busses give about the same throughput and access delay results as the 10 km bus because the latency introduced by using a 125 $\mu$s cycle dominates over the time of flight latency in the system. For the 1000 km long bus one see that the access delay is found to be much shorter than in the 1000 km system using a centralized token server, especially at low load are tokens found very close to where the user request arrived and delay is about the same for all systems. Even at very high load the access delay is about 1 millisecond shorter than in the system with the centralized server.

The centralized token manager system will have the same performance almost independently of the traffic as long as processing and signaling are sufficient. To evaluate the distributed system two other traffic generators were used. First, we used a generator that simulate user requests arriving in bursts. When a request arrives we defined a new request to arrive with 90% probability after 200 $\mu$s. The result is that a burst of requests arrives to a node and forces high temporal locality of the source addresses. Second, to generate traffic more similar to client-server behavior the amount of traffic arriving were increased to 5 server nodes 0, 25, 50, 75 and 99. The probability of a server destination is also higher.

Figure 14:
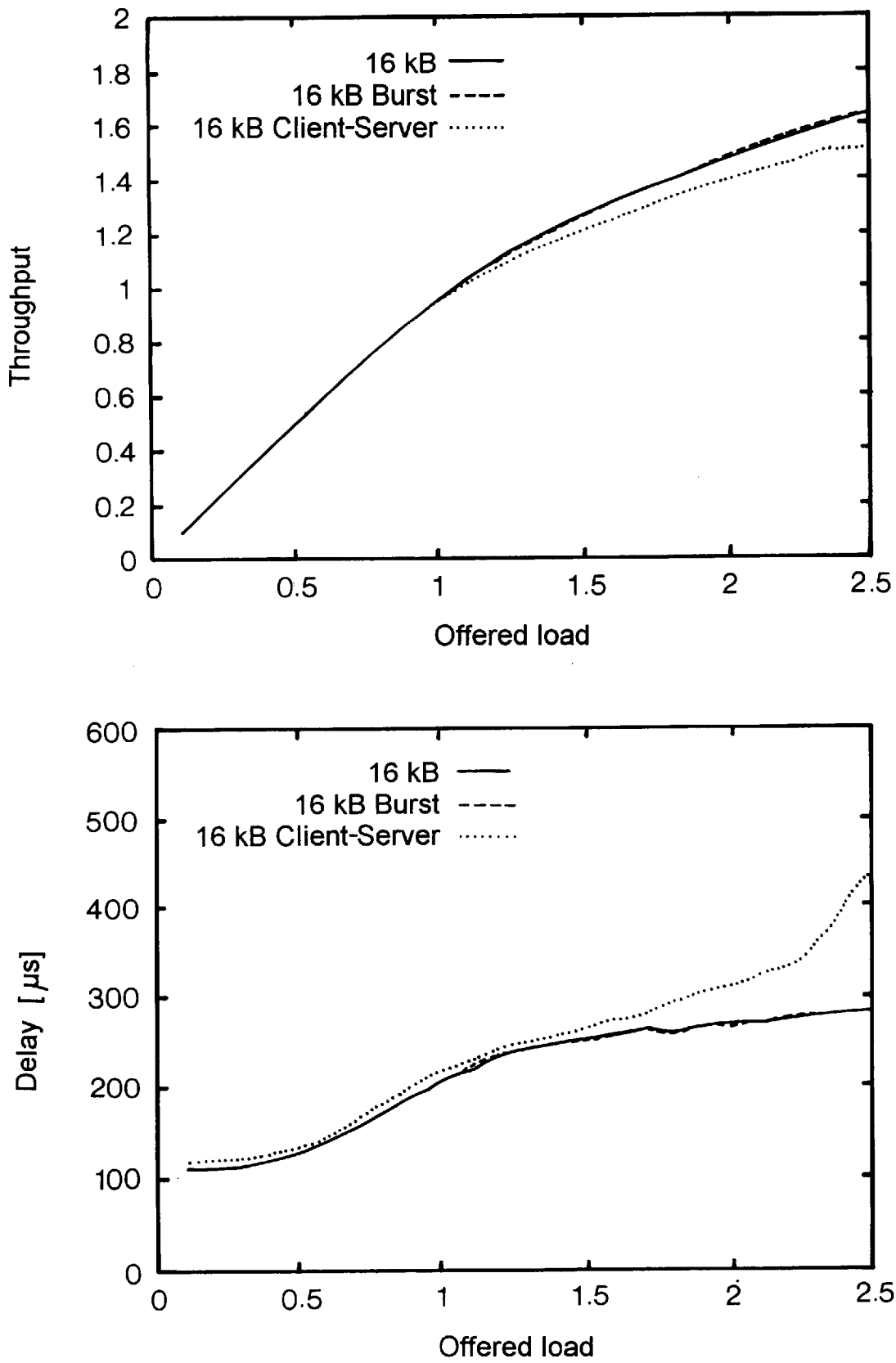
FIG. 14 illustrates the performance for different traffic conditions as simulated using a distributed token manager in a dual-bus DTM network with defragmentation and slot reuse according to the invention.

In FIG. 14 is presented throughput and access delay performance of the distributed token server system.

It is clear that the distributed implementation have several benefits but also drawbacks compared to the centralized token server. The nodes may share the processing load, there is less need for high-performance token servers, redundancy may be higher and access delay may be shorter for low capacity request. The drawbacks is higher blocking for an inflexible user which may therefore need to retry several times to gain access to necessary resources. It is also clear that the status message and status table mechanism must be changed to avoid unnecessary blocking when slot reuse is allowed.

When the load increases above a certain point, it gets difficult to find free tokens, blocking becomes significant and utilization only increases marginally with load. The degree of blocking at a given load depends-mainly on the minimum capacity requirement of user requests. The lower the minimum capacity, the higher the probability that the node will be able to satisfy the request. Furthermore, in these simulations only one round of token requests is sent out for each user request. Utilization can be increased by making several rounds (i.e., using retry), at the expense of longer access delay.

Assuming that the above waiting times are independent, the average medium access delay, if having a single control slot and if the network is lightly loaded, meaning that borrow is infrequent, will result in an average access delay around 125 $\mu$s (a single cycle).

In addition, due to fragmentation it may take many control messages to establish a channel, which adds even further to the load of the control channel, and thereby the access delay. In fact, without an efficient defragmentation scheme fragmentation is the dominating contributor to access delay in the simulations.

A consequence of DTM's slot reallocation mechanism is that it takes longer time to establish channels that need high bandwidth. This trade-off might be justified: the type of traffic that needs short medium access delay is usually less sensitive to the amount of bandwidth allocated for the transfer, and such traffic therefore can be accepted without much involvement of the reallocation protocol. For transfers that require high bandwidth, the access delay will be much longer and will almost always involve the reallocation protocol. However, in general high bandwidth transfers will probably be less sensitive to access delay.

These simulations have shown that the DTM fast circuit switching protocol performs well in a dual-bus shared media environment. Two slot (token) management schemes are analyzed and both perform well and can benefit from slot reuse. The centralized scheme performs closest to the ideal protocol and also result in a simple implementation. The distributed system is more sensitive to user behavior and must therefor rely on status information that is broadcast frequently and on the defragmentation method and arrangement according to the invention to decrease the number of control messages needed for channel establishment and slot reallocation. Using the defragmentation method and arrangement for long busses the distributed model shows better performance than the centralized model (comparing FIG.'s 11 and 13). A resource management system that combines the centralized and the distributed models using a small set of token server nodes is also possible.

Furthermore, connection establishment overhead can be designed to be very small, resulting in high utilization even for small (a few kbytes) transfers. Access delay is found to be a few hundred microseconds even at high load. The slot reuse method can increase performance by a factor of two without introducing any extra hardware in the nodes. Using the slot reuse scheme it is even more important to use the defragmentation method and arrangement according to the invention as fragmentation may occur in both slot and segment dimensions.

We claim:

1. A defragmentation method for increasing an average block size of free tokens in nodes of a circuit-switched network, the method comprising the steps of:
   providing free tokens having home nodes assigned thereto;
   providing a continuous slot range;
   providing slot-consecutive tokens;
   providing a node having a pool of free tokens;
   providing a token at network startup;
   defining a home node for each token at network startup;
   while defining the home node, defining, at least partially, the continuous slot range for tokens sharing the same home node;
   sending back free tokens to their respective home node when a significant period of time has passed; and
   while sending back free tokens, merging two or more slot-consecutive tokens into a single token when the slot-consecutive tokens are disposed in the free token pool of a node.

2. The defragmentation method according to claim 1 wherein the step of defining the home node comprises the step of defining the home node during network operation.

3. The defragmentation method according to claim 1 wherein the method further comprises the step of defining a single home node for all the tokens at network startup.

4. The defragmentation method according to claim 1 wherein the method further comprises the step of defining a single home node for all the tokens during network operation.

5. The defragmentation method according to claim 1 wherein the step of defining a home node comprises the step of defining all nodes as home nodes and distributing tokens among the home nodes during network startup.

6. The defragmentation method according to claim 1 wherein the step of defining a home node comprises the step of defining all nodes as home nodes and distributing tokens among the home nodes during network operation.

7. The defragmentation method according to claim 1 wherein the step of defining a home node comprises the step of defining a set of nodes as home nodes and distributing tokens among the home nodes during network startup.

8. The defragmentation method according to claim 1 wherein the step of defining a home node comprises the step of defining a set of nodes as home nodes and distributing tokens among the home nodes during network operation.

9. The defragmentation method according to claim 1 wherein the method further comprises the step of providing new home nodes and reallocating tokens to the new home nodes during network operation.

10. The defragmentation method according to claim 1 wherein step of sending back free tokens comprises the step of sending back free tokens to their respective home node when the free tokens have been idle for a significant period of time.

11. The defragmentation method according to claim 1 wherein step of sending back free tokens comprises the step of sending back free tokens to their respective home node when a certain network load threshold has been reached.

12. The defragmentation method according to claim 1 wherein the step of sending back free tokens comprises the step of sending back free tokens to their respective home node when the free tokens have been away from their respective home node for a significant period of time.

13. The defragmentation method according to claim 1 wherein the step of sending back free tokens comprises the step of sending back free tokens to their respective home node after a significant number of signal transfers have occurred.

14. The defragmentation method according to claim 1 wherein the method further comprises the steps of providing a local user that requests a token from a node and selecting the requested token from a free token pool by choosing a token from the free token pool having a smallest number slots that fulfill a requested capacity.

15. The defragmentation method according to claim 1 wherein the method further comprises the steps of a node requesting a token having a required capacity from another node and minimizing the number of tokens requested if no token has the requested capacity.

16. The defragmentation method according to claim 1 wherein the method further comprises the steps of:
    providing a block token format having a capacity;
    providing a source and a destination node;
    providing parameters and segments;
    providing disjointed segments of the network;
    providing a plurality of slots;
    extending the block token format to include the parameters describing the segments disposed between the source and the destination node;
    reserving the capacity of the block token format only on the segments disposed between the source and the destination node; and
    transmitting the throughput simultaneously in the same slot over disjointed segments of the network.

17. The defragmentation method according to claim 16 wherein the method further comprises the steps of providing a slot range and a pool of free tokens of a node and providing two or more segment-consecutive tokens represented in the same slot range and merging the segment-consecutive tokens into a single token when the segment-consecutive tokens are disposed in the pool of free tokens of a node.

18. The defragmentation method according to claim 17 wherein the method further comprises the step of providing segment ranges and merging two or more slot-consecutive tokens representing the same segment range when the slot-consecutive tokens are disposed in the pool of free tokens of a node.

19. The defragmentation method according to claim 18 wherein the method further comprises the steps of dividing two segment-consecutive tokens, representing, at least partially, the same slot range and the two segment-consecutive tokens existing in the pool of free tokens of a node, and obtaining segment-consecutive tokens representing the same slot range and merging the segment-consecutive tokens into a single token.

20. The defragmentation method according to claim 16 wherein the method further comprises the steps of providing a local user requesting a token having a required capacity from a node, selecting a token from a token pool by using a best-fit algorithm in slot number and segment number dimensions, and choosing a token having a smallest area in a token map that fulfills the required capacity.

21. The defragmentation method according to claim 16 wherein the method further comprises the steps of providing a remote user requesting a token having a required capacity from a node, selecting a token from a token pool by using a best-fit algorithm in slot number and segment number dimensions, and choosing a token having a smallest area in a token map that fulfills the required capacity.

22. The defragmentation method according to claim 16 wherein the method further comprises the steps of providing a node requesting a token fulfilling a required capacity from another node and minimizing the number of tokens requested if no token fulfills the required capacity.

* * * * *